(12) United States Patent
Yamamoto et al.

(10) Patent No.: US 11,971,637 B2
(45) Date of Patent: Apr. 30, 2024

(54) DISPLAY DEVICE AND METHOD OF INSPECTION

(71) Applicant: Japan Display Inc., Tokyo (JP)

(72) Inventors: Koji Yamamoto, Minato-ku (JP);
Naoyuki Obinata, Minato-ku (JP);
Kengo Shiragami, Minato-ku (JP)

(73) Assignee: Japan Display Inc., Tokyo (JP)

( * ) Notice: Subject to any disclaimer, the term of this patent is extended or adjusted under 35 U.S.C. 154(b) by 339 days.

(21) Appl. No.: 17/474,099

(22) Filed: Sep. 14, 2021

(65) Prior Publication Data

US 2021/0405491 A1    Dec. 30, 2021

Related U.S. Application Data

(63) Continuation of application No. PCT/JP2020/002395, filed on Jan. 23, 2020.

(30) Foreign Application Priority Data

Mar. 18, 2019   (JP) ................................. 2019-050333

(51) Int. Cl.
*G02F 1/1362*   (2006.01)
*G02F 1/1345*   (2006.01)
(Continued)

(52) U.S. Cl.
CPC .... *G02F 1/136286* (2013.01); *G02F 1/13452* (2013.01); *G02F 1/13458* (2013.01);
(Continued)

(58) Field of Classification Search
CPC ............. G02F 1/13452; G02F 1/13458; G02F 1/136254; G02F 1/136286; G06T 7/0004;
(Continued)

(56) References Cited

U.S. PATENT DOCUMENTS

| | | | |
|---|---|---|---|
| 2013/0258263 A1* | 10/2013 | Yasukawa | G02F 1/136286 349/138 |
| 2015/0346565 A1 | 12/2015 | Okumoto | |
| 2016/0140896 A1* | 5/2016 | Kwon | G09G 3/006 345/76 |

FOREIGN PATENT DOCUMENTS

| | | | |
|---|---|---|---|
| JP | 11-142887 A | | 5/1999 |
| JP | H11142887 A | * | 5/1999 |

(Continued)

OTHER PUBLICATIONS

Office Action dated Sep. 9, 2022 in the corresponding Indian Patent Application No. 202117041678 (6 pp).

(Continued)

*Primary Examiner* — Amy Onyekaba
*Assistant Examiner* — Cory A Almeida
(74) *Attorney, Agent, or Firm* — Maier & Maier, PLLC

(57) ABSTRACT

A display device includes wires that are coupled to driver terminals that are able to be coupled to a driver integrated circuit (IC) and that are provided along a first direction and extending so as to spread toward outsides in the first direction as the wires are directed toward a second direction orthogonal to the first direction; and dummy wires that are provided along the wires on one outside and another outside in the first direction of the wires and that are not coupled to the driver terminals and the wires, wherein a number of the dummy wires on the one outside and a number of the dummy wires on the other outside are respectively three or more, the dummy wires extend in parallel with the wires, and a width of the dummy wire is equal to a width of the wire.

5 Claims, 11 Drawing Sheets

(51) Int. Cl.
*G06T 7/00* (2017.01)
*G09F 9/30* (2006.01)
*G09G 3/00* (2006.01)
*G09G 3/20* (2006.01)

(52) U.S. Cl.
CPC ...... *G02F 1/136254* (2021.01); *G06T 7/0004* (2013.01); *G09F 9/30* (2013.01); *G09G 3/006* (2013.01); *G09G 3/2092* (2013.01); *G06T 2207/30121* (2013.01); *G09G 2300/0413* (2013.01)

(58) Field of Classification Search
CPC ........... G06T 2207/30121; G09F 9/30; G09G 3/006; G09G 3/2092; G09G 2300/0413; G09G 3/32; G09G 3/36
See application file for complete search history.

(56) References Cited

FOREIGN PATENT DOCUMENTS

| | | |
|---|---|---|
| JP | 2010010285 A | 1/2010 |
| JP | 2010-243524 A | 10/2010 |
| JP | 2011-158707 A | 8/2011 |
| JP | 2015-225144 A | 12/2015 |
| JP | 2019-191403 A | 10/2019 |
| KR | 970066685 A | 10/1997 |

OTHER PUBLICATIONS

International Search Report dated Mar. 17, 2020 in PCT/JP2020/002395, citing references AA and AP-AS therein, 2 pages.
Office Action issued on Jan. 25, 2024, in corresponding Indian Application No. 202117041678, 2 pages.

* cited by examiner

DISPLAY DEVICE AND METHOD OF INSPECTION

CROSS-REFERENCE TO RELATED APPLICATION

This application is a continuation of PCT International Application No. PCT/JP2020/002395 filed on Jan. 23, 2020 which claims the benefit of priority from Japanese Patent Application No. 2019-050333 filed on Mar. 18, 2019, the entire contents of which are incorporated herein by reference.

BACKGROUND

1. Technical Field

The present invention relates to a display device and a method of inspection.

2. Description of the Related Art

Various techniques to inspect display devices have been studied in order to ensure reliability of the display devices. Japanese Patent Application Laid-open Publication No. 2010-243524 states that a display device is provided with terminals for inspection coupled to signal lines coupled to pixels, for example. According to Japanese Patent Application Laid-open Publication No. 2010-243524, a data signal for inspection is input from the terminals for inspection, thereby causing the pixels to develop color according to the data signal for inspection to perform an inspection of a color development state.

In recent years, along with display devices having higher resolution, there have been tendencies for the number of wires to increase and for the wires to be thinned, causing a possibility that wires with a locally thinned line width are produced. In such display devices, when an accumulated time during which a drive current passes becomes longer along with a lapse of a drive time, portions with a locally thinned line width of the wires may be broken caused by the stress of the drive current. Other than such portions with a locally thinned line width, it is also required that portions that may be broken or have been broken be detected. Consequently, it is required that whether there is any portion that may be broken or the like is made detectable to prevent a deterioration of reliability.

The present invention has been made in view of the above problem, and an object thereof is to provide a display device and a method of inspection that can prevent a deterioration of reliability.

SUMMARY

According to one aspect, there is provided a display device comprising: wires that are coupled to driver terminals that are able to be coupled to a driver integrated circuit (IC) and that are provided along a first direction and extending so as to spread toward outsides in the first direction as the wires are directed toward a second direction orthogonal to the first direction; and dummy wires that are provided along the wires on one outside and another outside in the first direction of the wires and that are not coupled to the driver terminals and the wires, wherein a number of the dummy wires on the one outside and a number of the dummy wires on the other outside are respectively three or more, the dummy wires extend in parallel with the wires, and a width of the dummy wire is equal to a width of the wire.

According to one aspect, there is provided a method for inspecting the display device according to the display device described above, the method comprising imaging an area including the wires and the dummy wires to inspect the wires.

DETAILED DESCRIPTION

The following describes embodiments of the present invention with reference to the accompanying drawings. What is disclosed herein is only by way of example, and some appropriate modifications with the gist of the invention maintained that can easily be thought of by those skilled in the art are naturally included in the scope of the present invention. The drawings may be represented more schematically for the width, thickness, shape, and the like of parts than those of actual aspects in order to make the description clearer; they are only by way of example and do not limit the interpretation of the present invention. In the present specification and drawings, components similar to those previously described for the drawings previously described are denoted by the same symbols, and a detailed description may be omitted as appropriate.

(Configuration of Display Device)

Figure 1:
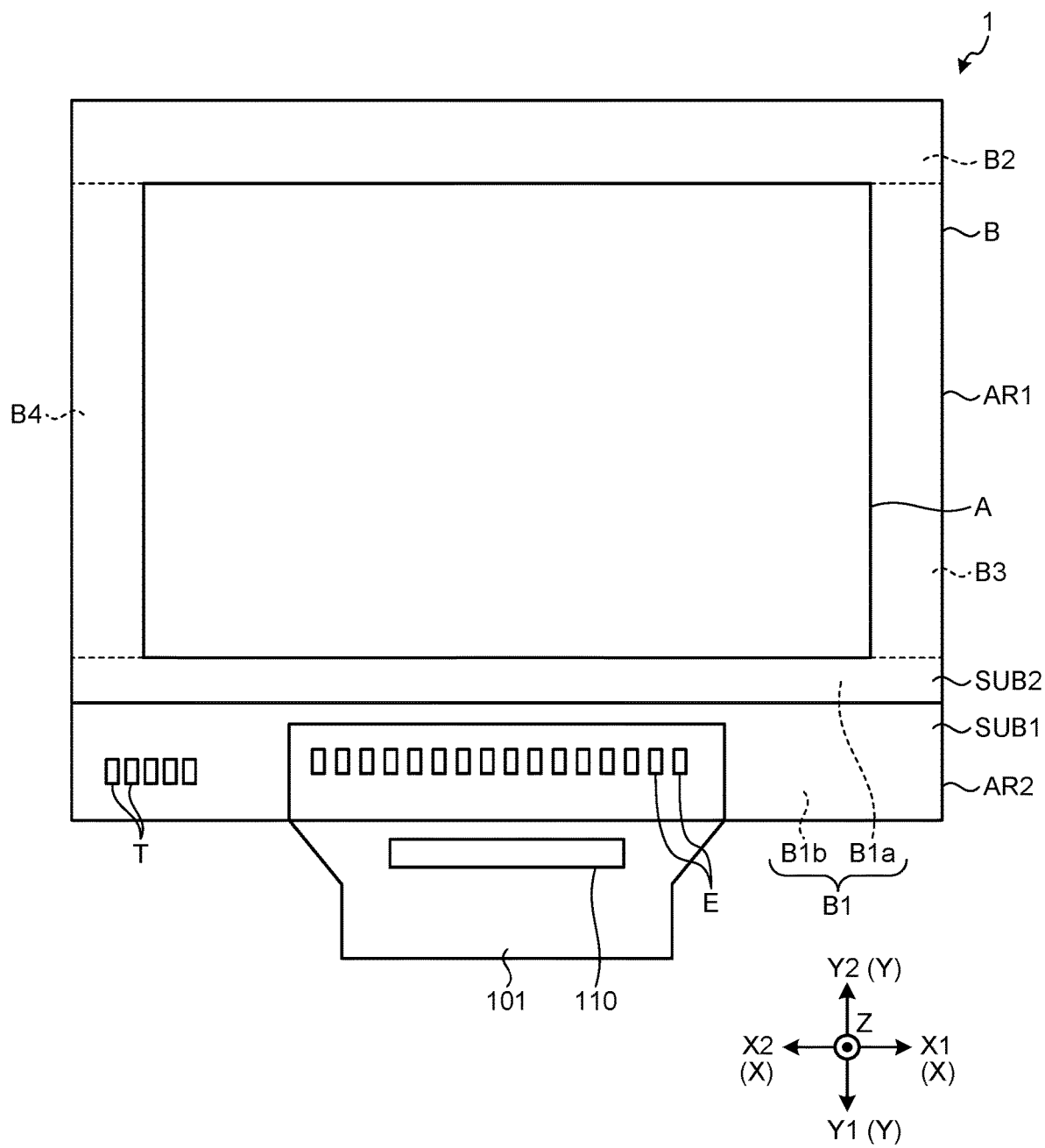
FIG. 1 is a plan view schematically illustrating a display device according to the present embodiment.

FIG. 1 is a plan view schematically illustrating a display device according to the present embodiment. As illustrated in FIG. 1, this display device 1 according to the present embodiment includes a first substrate SUB1 as array substrate and a second substrate SUB2 as a counter substrate. In the following, a direction parallel to the surface of the first substrate SUB1 and the second substrate SUB2 is defined as a first direction X. A direction parallel to the surface of the first substrate SUB1 and the second substrate SUB2 and crossing the first direction X, or orthogonal to the first direction X in this example, is defined as a second direction Y. A direction toward one side in the first direction X is defined as a direction X1, whereas a direction toward the other side in the first direction X, that is, a direction opposite to the direction X1, is defined as a direction X2. A direction toward one side in the second direction Y is defined as a direction Y1, whereas a direction toward the other side in the second direction Y, that is, a direction opposite to the direction Y1, is defined as a direction Y2. A direction orthogonal to the first direction X and the second direction Y, that is, a direction orthogonal to the surface of the first substrate SUB1 and the second substrate SUB2, is defined as a direction Z.

The first substrate SUB1 and the second substrate SUB2 are stacked on each other in the direction Z. The first substrate SUB1 has a larger area than that of the second substrate SUB2. The first substrate SUB1 is stacked such that a part on the direction Y1 side protrudes toward the direction Y1 from the second substrate SUB2 when viewed in the direction Z. That is to say, the display device 1 has a superimposed area AR1, in which the first substrate SUB1 and the second substrate SUB2 are superimposed on each other, and a projecting area AR2, in which the second substrate SUB2 is not provided and only the first substrate SUB1 is provided. The projecting area AR2 is adjacent to the superimposed area AR1 on the direction Y1 side.

The display device 1 has a display area A and a peripheral area B. The display area A is an area in which multiple pixels are disposed to display images. The peripheral area B is an area in which no pixels are disposed, and no images are displayed. The peripheral area B is an area outside the display area A when viewed in the direction Z. In the present embodiment, the peripheral area B has a frame shape surrounding the display area A and can also be referred to as a frame area. The display area A is provided within the superimposed area AR1, in which the first substrate SUB1 and the second substrate SUB2 are superimposed on each other. The peripheral area B is an area within the first substrate SUB1. In other words, part of the peripheral area B is provided within the superimposed area AR1, whereas the other part thereof is provided within the projecting area AR2. That is to say, the peripheral area B is provided from the superimposed area AR1 to the projecting area AR2. Consequently, the first substrate SUB1 can be said to have the display area A and the peripheral area B and, in other words, can be said to be sectioned into the display area A and the peripheral area B.

The peripheral area B includes a first peripheral area B1, a second peripheral area B2, a third peripheral area B3, and a fourth peripheral area B4. The first peripheral area B1 is the peripheral area B on the direction Y1 side of the display area A. The second peripheral area B2 is the peripheral area B on the direction Y2 side of the display area A and, in other words, is the peripheral area B on an opposite side from the first peripheral area B1 across the display area A. The third peripheral area B3 is the peripheral area B on the direction X1 side of the display area A. The fourth peripheral area B4 is the peripheral area B on the direction X2 side of the display area A and, in other words, is the peripheral area B on an opposite side from the third peripheral area B3 across the display area A.

The first peripheral area B1 is provided from the superimposed area AR1 to the projecting area AR2 on the direction Y1 side of the superimposed area AR1. That is to say, the first peripheral area B1 includes an inner peripheral area B1a positioned within the superimposed area AR1 and an outer peripheral area B1b positioned within the projecting area AR2. The second peripheral area B2, the third peripheral area B3, and the fourth peripheral area B4 are positioned within the superimposed area AR1. That is to say, the superimposed area AR1 is occupied by the display area A, the inner peripheral area B1a, the second peripheral area B2, the third peripheral area B3, and the fourth peripheral area B4, whereas the projecting area AR2 is occupied by the outer peripheral area B1b.

The outer peripheral area B1b of the first peripheral area B1 is provided with a wiring board 101. The wiring board 101 includes a flexible printed circuit (FPC) board, for example. The wiring board 101 is provided with a driver integrated circuit (IC) 110. The driver IC 110 includes a control circuit controlling the display of the display device 1, a detection circuit, and an analog frontend. The display device 1 is only required to be able to be coupled to the wiring board 101 and the driver IC 110, and the display device 1 does not necessarily include the wiring board 101 or the driver IC 110. The display device 1 may include the wiring board 101 and the driver IC 110.

The display device 1 further has multiple driver terminals E provided in the peripheral area B and multiple inspection terminals T provided in the peripheral area B. In the present embodiment, the driver terminals E and the inspection terminals T are provided in the first peripheral area B1 and, in more detail, are provided in the outer peripheral area B1b of the first peripheral area B1. Although the inspection terminals T are provided on the direction X2 side of the driver terminals E in the example in FIG. 1, this is not limiting.

The driver terminals E are terminals that can be coupled to the driver IC 110. The driver terminals E are terminals for supplying various kinds of signals output from the coupled driver IC 110 to wires of the display device 1. The inspection terminals T are terminals for performing an inspection of the wires, or aging treatment in this example. The aging treatment will be described below.

Figure 2:
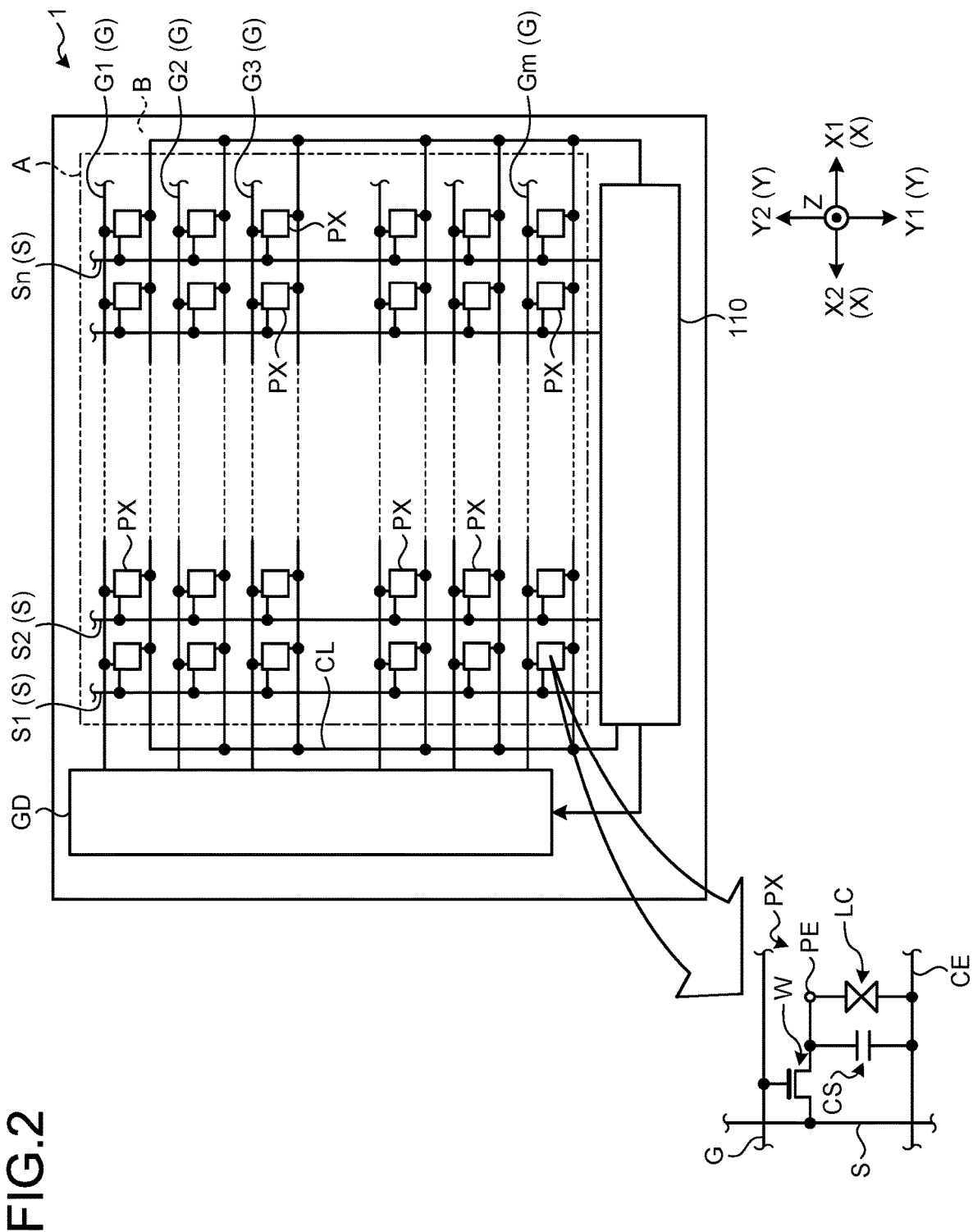
FIG. 2 is a schematic diagram of a pixel arrangement of the display device according to the present embodiment.

FIG. 2 is a schematic diagram of a pixel arrangement of the display device according to the present embodiment. As illustrated in FIG. 2, the display device 1 includes multiple pixels PX in the display area A. The pixels PX are arranged in a matrix (row-column configuration) in the first direction X and the second direction Y. The display device 1 has multiple wires in the display area A. The display device 1 includes m scan lines G (G1 to Gm), n signal lines S (S1 to Sn), and a common line CL as the wires provided in the display area A. The letters m and n are each an integer of 2 or more. The scan lines G are coupled to a gate driver GD. Signals required for the operation of the gate driver GD are supplied from the driver IC 110. The signal lines S and the common line CL are coupled to the driver IC 110. The scan lines G, the gate drive GD, the signal lines S, and the common line CL are formed in the first substrate SUB1 illustrated in FIG. 1.

The pixels PX include a switching element W, a pixel electrode PE, a common electrode CE, and a liquid crystal layer LC. The switching element W includes a thin film transistor (TFT), for example, and is electrically coupled to a scan line G and a signal line S. The pixel electrode PE is electrically coupled to the switching element W. The common electrode CE is electrically coupled to the common line CL.

The gate driver GD outputs a control signal making the switching element W coupled to the scan line G a conduction state to the scan line G. The driver IC 110 outputs an image signal to the signal line S in a period during which the switching element W is in the conduction state. Thus, a desired pixel potential is written into the pixel electrode PE. The driver IC 110 supplies a common potential to the common line CL. Thus, the common electrode CE is made the common potential. In each of the pixels PX, the pixel electrode PE faces the common electrode CE, and the liquid crystal layer LC is driven by an electric field occurring by the potential difference between the pixel potential of the pixel electrode PE and the common potential of the common electrode CE. A holding capacitance CS is formed between an electrode with the same potential as the common electrode CE and an electrode with the same potential as the pixel electrode PE, for example.

Figure 3:
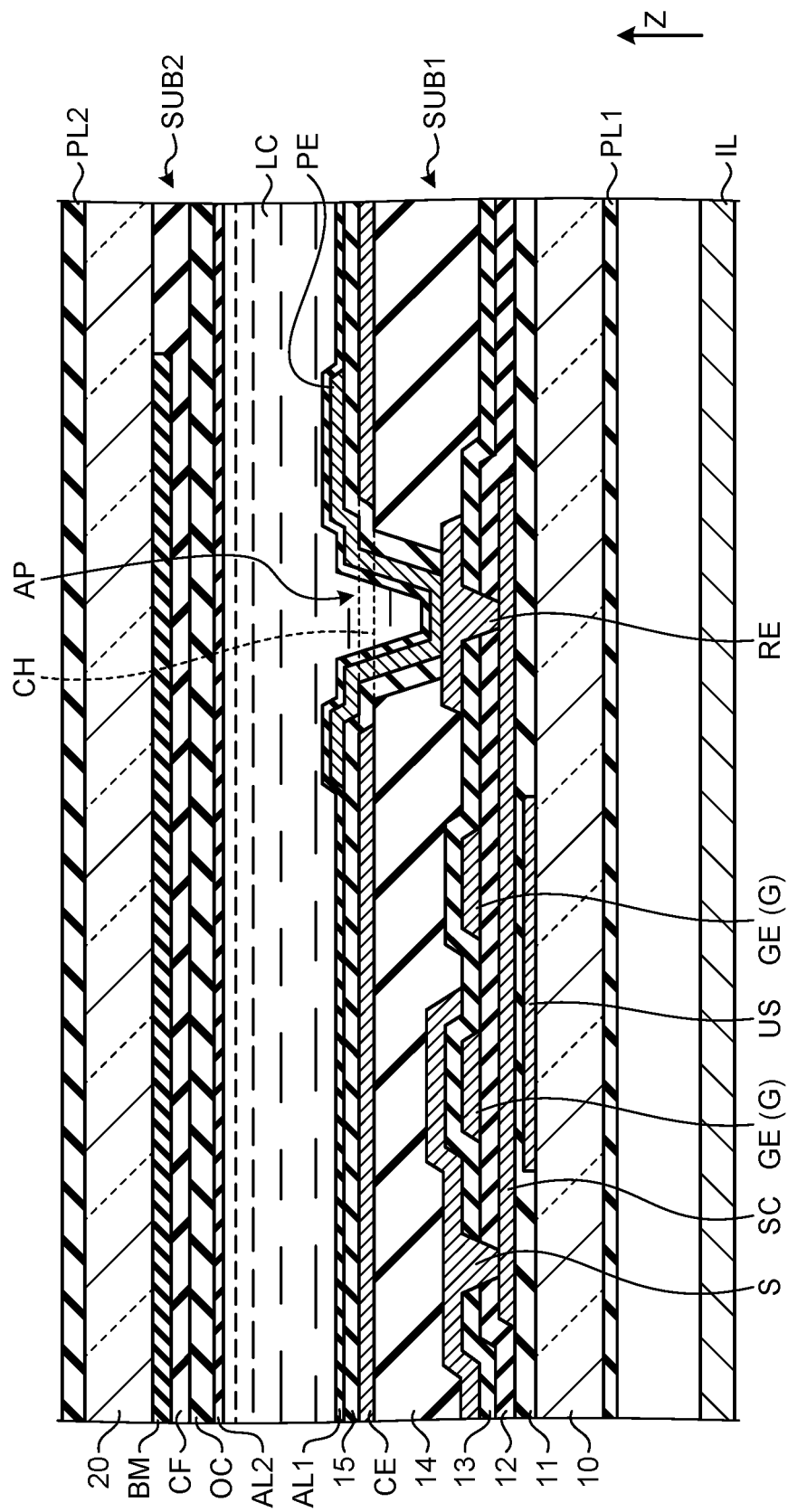
FIG. 3 is a schematic sectional view of the display device according to the present embodiment.

FIG. 3 is a schematic sectional view of the display device according to the present embodiment. As illustrated in FIG. 3, in the display device 1, the first substrate SUB1 and the second substrate SUB2 are stacked on each other in the direction Z. The first substrate SUB1 includes an insulating substrate 10, insulating layers 11, 12, 13, 14, and 15, a lower light shielding layer US, a semiconductor layer SC, the scan lines G, the signal lines S, a connection electrode RE, the common electrode CE, the pixel electrode PE, and an orientation film AL1. The insulating substrate 10 is a transparent substrate such as a glass substrate or a resin substrate. The lower light shielding layer US is positioned between the insulating substrate 10 and the insulating layer 11. Although in the example in FIG. 3 the lower light shielding layer US is formed across both gate electrodes so as to be superimposed thereon, it may be formed spaced apart from each other for each of the gate electrodes. The semiconductor layer SC is positioned between the insulating layer 11 and the insulating layer 12. Although the semiconductor layer SC is formed of polycrystalline silicon, for example, it may be formed of amorphous silicon or an oxide semiconductor. Two gate electrodes GE as parts of the scan lines G are positioned between the insulating layer 12 and the insulating layer 13. The signal lines S and the connection electrode RE are positioned between the insulating layer 13 and the insulating layer 14. The signal lines S and the connection electrode RE are each in contact with the semiconductor layer SC. The common electrode CE is positioned between the insulating layer 14 and the insulating layer 15. The pixel electrode PE is positioned between the insulating layer 15 and the orientation film AL1. Parts of the pixel electrode PE faces the common electrode CE via the insulating layer 15. The common electrode CE and the pixel electrode PE are formed of a conductive material having optical transparency such as indium tin oxide (ITO) or indium zinc oxide (IZO). The pixel electrode PE is in contact with the connection electrode RE via a contact hole CH passing through the insulating layers 14 and 15 at a position superimposed on an opening AP of the common electrode CE. The insulating layers 11 to 13 and the insulating layer 15 are each a transparent inorganic insulating layer such as a silicon oxide, a silicon nitride, or a silicon oxide nitride and may have a single-layer structure or a multilayered structure. The insulating layer 14 is a transparent organic insulating layer such as an acrylic resin.

The second substrate SUB2 includes an insulating substrate 20, a light shielding layer BM, a color filter layer CF, an overcoat layer OC, and an orientation film AL2. The insulating substrate 20 is a transparent substrate such as a glass substrate or a resin substrate. The light shielding layer BM and the color filter layer CF are positioned between the insulating substrate 20 and the overcoat layer OC. The orientation film AL2 covers the overcoat layer OC.

The liquid crystal layer LC is positioned between the first substrate SUB1 and the second substrate SUB2 and is held between the orientation film AL1 and the orientation film AL2. The liquid crystal layer LC includes a positive (dielectric anisotropy of which is positive) liquid crystal material or a negative (dielectric anisotropy of which is negative) liquid crystal material. A polarizing plate PL1 is placed below the first substrate SUB1 (an opposite side from the second substrate SUB2). A polarizing plate PL2 is placed above the second substrate SUB2 (an opposite side from the first substrate SUB1). Apart from the polarizing plates PL1 and PL2, a phase plate, a scattering layer, an antireflection layer, or the like may be included as needed. An illumination device IL is positioned below the polarizing plate PL1 (an opposite side from the first substrate SUB1).

Thus, in the example in FIG. 3, the display device 1 is a lateral electric field mode, or in more detail, a fringe field switching (FFS) mode liquid crystal display device. However, the display device 1 is not limited to the FFS mode, and may be any display device such as a longitudinal electric field mode display device.

The display device 1 has a configuration for performing the inspection of the wires. The following describes the configuration for performing the inspection of the wires.

Figure 4:
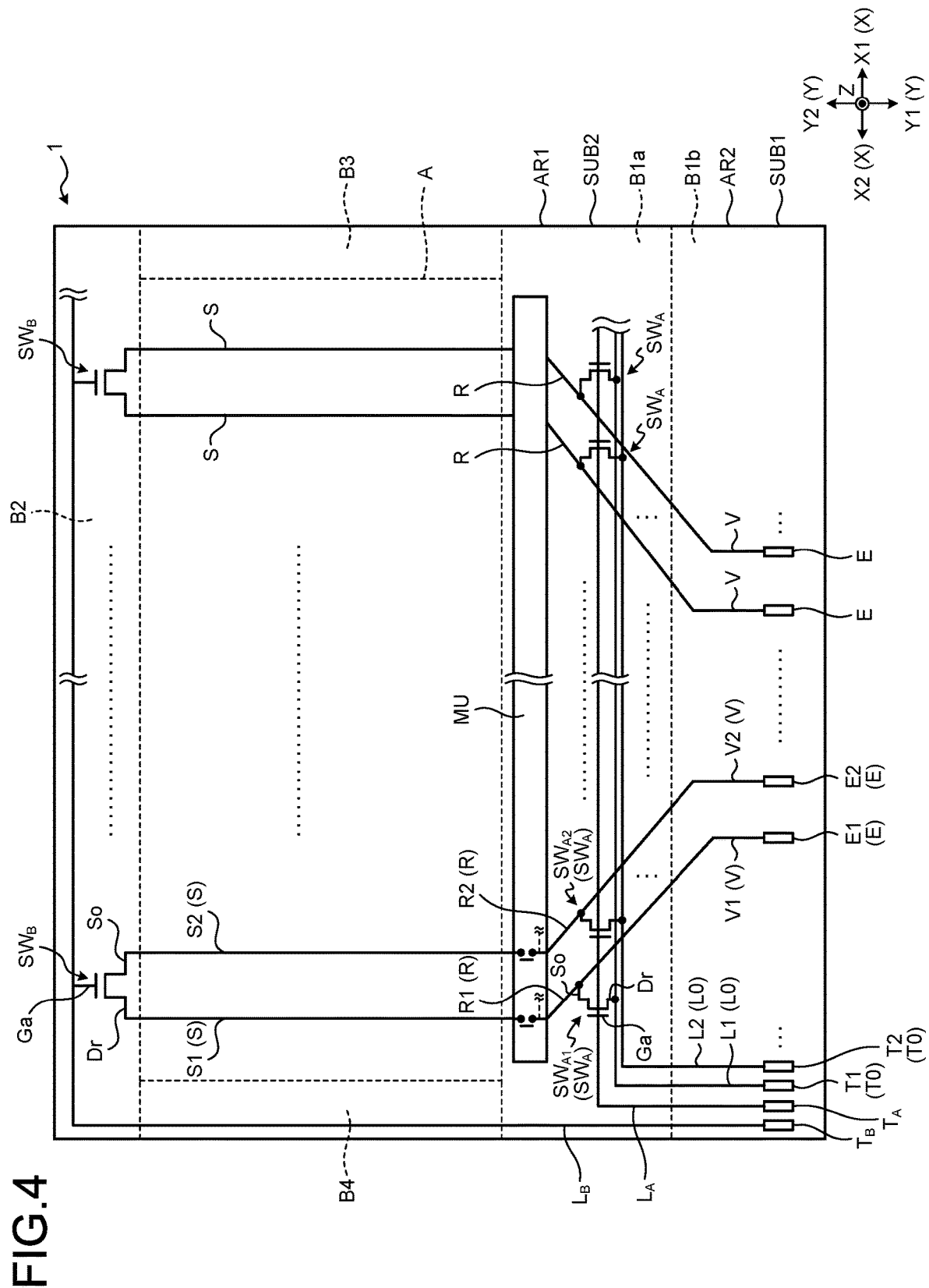
FIG. 4 is a schematic circuit diagram of a configuration of the display device according to the present embodiment.

FIG. 4 is a schematic circuit diagram of a configuration of the display device according to the present embodiment. The following first describes how components for performing the inspection of the wires are coupled to each other based on FIG. 4. As illustrated in FIG. 4, each of the driver terminals E of the display device 1 is coupled to each of signal lines S via each of wires V as video lines, each of connection lines R, and a connection circuit MU. That is to say, each of the wires V is coupled to each of the respective driver terminals E and each of the respective connection lines R. Each of the connection lines R is coupled to the connection circuit MU. Although FIG. 4 illustrates two driver terminals E1 and E2 as the driver terminals E for convenience of description, the number of actual driver terminals E may be larger than two. The driver terminal E1 is coupled to the connection circuit MU via a wire V1 and a connection line R1. The driver terminal E2 is coupled to the connection circuit MU via a wire V2 and a connection line R2. The connection circuit MU is provided on the direction Y2 side of the driver terminals E and is positioned within the inner peripheral area B1a of the first peripheral area B1. The wires V1 and V2 are provided from the outer peripheral area B1b closer to the driver terminals E1 and E2 to the inner peripheral area B1a closer to the connection lines R1 and R2. The connection line R1 and R2 are provided within the inner peripheral area B1a. That is to say, the wires V are at least partially provided in the outer peripheral area B1b, in which the first substrate SUB1 and the second substrate SUB2 are not superimposed on each other. On the other hand, the connection lines R are provided in the inner peripheral area B1a, in which the first substrate SUB1 and the second substrate SUB2 are superimposed on each other, across the entire section.

The wires V and the connection lines R are coupled to first switches $SW_A$ described below. It can be said that each of the wires V is a wire between each of the first switches $SW_A$ and each of the respective driver terminals E, whereas each of the connection lines R is a wire between each of the first switches $SW_A$ and the respective signal lines S (or the connection circuit MU).

The connection circuit MU is coupled to the connection lines R and the signal lines S to switch connection between the connection lines R and the signal lines S. Each of the connection lines R is coupled to each of the wires V, and thus it can also be said that the connection circuit MU is coupled to the wires V and the signal lines S to switch connection between the wires V and the signal lines S. In other words, the connection circuit MU couples at least one signal line S selected out of the signal lines S and a connection line R (a wire V) to each other. In the present embodiment, the connection circuit MU couples at least either the signal line S1 or another signal line S (not illustrated in FIG. 4) to the connection line R1 (the wire V1), that is, the driver terminal E1. The connection circuit MU couples at least either the signal line S2 or another signal line S (not illustrated in FIG. 4) to the connection line R2 (the wire V2), that is, the driver terminal E2.

Thus, in the display device 1, each of the driver terminals E is coupled to each of the signal lines S via each of the wires V, each of the connection lines R, and the connection circuit MU. That is to say, the wires V and the signal lines S are coupled to each other via the connection lines R and the connection circuit MU. Consequently, when a signal is output from the driver IC 110 with the driver terminals E coupled to the driver IC 110, the signal from the driver IC 110 is output to each of the signal lines S as an image signal via each of the driver terminals E, each of the wires V, each of the connection lines R, and the connection circuit MU.

The display device 1 has the first switches $SW_A$ and second switches $SW_B$ within the first substrate SUB1. Each of the first switches $SW_A$ and the second switches $SW_B$ is a switching element, or a transistor in this example. The display device 1 has switch terminals $T_A$ and $T_B$ and output terminals T1 and T2 as the inspection terminals T. Each of the switch terminals $T_A$ and $T_B$ is a terminal for outputting a gate signal to each of the first switches $SW_A$ and the second switches $SW_B$. Each of the output terminals T1 and T2 is a terminal for outputting current for aging treatment to each of the signal lines S. Although the number of the output terminals T1 and T2 is two for convenience of description in FIG. 4, the actual number is any number and may be six, for example.

Each of the output terminals T1 and T2 is coupled to each of connection lines L1 and L2. The connection lines L1 and L2 extend from portions within the outer peripheral area B1b, where they are coupled to the output terminals T1 and T2, respectively, to the inner peripheral area B1a and extend in the direction X1 within the inner peripheral area B1a. In the following, when the output terminals T1 and T2 are not distinguished from each other, they are referred to as an output terminal T0, whereas when the connection lines L1 and L2 are not distinguished from each other, they are referred to as a connection line L0. That is to say, it can be said that the output terminal T0 is coupled to the connection line L0.

The first switches $SW_A$ as switches are provided within the first peripheral area B1 and are provided closer to the display area A than the driver terminals E (on the direction Y2 side of the driver terminals E) within the first peripheral area B1. In the present embodiment, the first switches $SW_A$ are provided within the inner peripheral area B1a. In more detail, the first switches $SW_A$ may be provided at positions superimposed on the color filter layer CF when viewed in the direction Z in the inner peripheral area B1a, in which the first substrate SUB1 and the second substrate SUB2 are superimposed on each other. The first switches $SW_A$ are coupled to the connection line L0. That is to say, the first switches $SW_A$ are coupled to the output terminal T0 via the connection line L0. The first switches $SW_A$ are also coupled to the wires V and the connection lines R respectively. That is to say, it can also be said that each of the first switches $SW_A$ is coupled to each of the driver terminals E via each of the wires V and is coupled to each of the signal lines S via each of the connection lines R. Specifically, each of drain electrodes Dr of each of the first switches $SW_A$ is coupled to the connection line L0. Each of respective source electrodes So of the first switches $SW_A$ is coupled to each of the wires V and each of the connection lines R.

Among the first switches $SW_A$, first switches $SW_{A1}$ and $SW_{A2}$ are provided in the example in FIG. 4. A drain electrode Dr of the first switch $SW_{A1}$ is coupled to the connection line L1, whereas a source electrode So thereof is coupled to the wire V1 and the connection line R1. A drain electrode Dr of the first switch $SW_{A2}$ is coupled to the connection line L2, whereas a source electrode So thereof is coupled to the wire V2 and the connection line R2. That is to say, the drain electrode Dr of the first switches $SW_A$ is coupled to one of the connection lines L0, whereas the source electrode So thereof is coupled to one of the wires V and one of the connection lines R. The number of the first switches $SW_A$, which is any number, is preferably the same number as that of the signal lines S.

The switch terminal $T_A$ is coupled to the connection line $L_A$. The connection line $L_A$ extends from a portion within the outer peripheral area B1b in which the connection line $L_A$ is coupled to the switch terminal $T_A$, to the inner peripheral area B1a and extends in the direction X1 within the inner peripheral area B1a. The connection line $L_A$ is coupled to the first switches $SW_A$ within the inner peripheral area B1a. In more detail, the connection line $L_A$ is coupled to each of gate electrodes Ga of the first switches $SW_A$. That is to say, each of the gate electrodes Ga of the first switches $SW_A$ is coupled to the switch terminal $T_A$ via the connection line $L_A$. The connection line $L_A$ is coupled to each of the gate electrodes Ga of the first switches $SW_A$, or each of the gate electrodes Ga of the first switches $SW_{A1}$ and $SW_{A2}$ in FIG. 4. That is to say, one connection line $L_A$ is coupled to each of the first switches $SW_A$.

Thus, each of the drain electrodes Dr of the first switches $SW_A$ is coupled to the connection line L0, each of the source electrodes So thereof is coupled to each of the wires V and each of the connection lines R, and each of the gate electrodes Ga thereof is coupled to the connection line $L_A$. Consequently, upon input of a current (the gate signal) to each of the gate electrodes Ga from the switch terminal $T_A$ via the connection line $L_A$, the first switches $SW_A$ electrically connect the connection line L0 and each of the connection lines R, that is, the output terminal T0 and each of the signal lines S, to each other. On the other hand, without the current (the gate signal) input to each of the gate electrodes Ga, the first switches $SW_A$ electrically interrupt (decouple) the connection line L0 and each of the connection lines R, that is, the output terminal T0 and each of the signal lines S, from each other. Thus, the first switches $SW_A$ are configured to be able to switch between connection and interruption between the output terminal T0 and each of the signal lines S. In other words, the first switches $SW_A$ switch between connection and interruption between the output terminal T0 and each of the signal lines S by the gate signal from the switch terminal $T_A$.

The second switches $SW_B$ are provided in the second peripheral area B2. That is to say, the second switches $SW_B$ are provided on the direction Y2 side of the first switches $SW_A$ provided in the first peripheral area B1 and the signal lines S provided within the display area A. Each of the second switches $SW_B$ is coupled to multiple signal lines S, and in the present embodiment, is coupled to two signal lines S. Specifically, each of drain electrodes Dr of the second switches $SW_B$ is coupled to one signal line S out of the two signal lines S, whereas each of source electrodes So thereof is coupled to the other signal line S out of the two signal lines S. Each of the second switches $SW_B$ is preferably coupled to each of ends of the signal lines S on the direction Y2 side.

Among the second switches $SW_B$, FIG. 4 illustrates only one of them for convenience of description. In the example in FIG. 4, the drain electrode Dr of the second switch $SW_B$ is coupled to the signal line S1, whereas the source electrode So thereof is coupled to the signal line S2. In the second switches $SW_B$, the source electrode So and the drain electrode Dr may be interchanged. The number of the second switches $SW_B$, which is any number, is preferably half the number of the signal lines S.

The switch terminal $T_B$ is coupled to the connection line $L_B$. The connection line $L_B$ extends from a portion within the outer peripheral area B1b in which the connection line $L_B$ is coupled to the switch terminal $T_B$, through the inner peripheral area B1a and the fourth peripheral area B4 (or the third peripheral area B3) to the second peripheral area B2 and extends in the direction X1 within the second peripheral area B2. The connection line $L_B$ is coupled to the second switches $SW_B$ within the second peripheral area B2. More specifically, the connection line $L_B$ is coupled to each of the gate electrodes Ga of the second switches $SW_B$. That is to say, each of the gate electrodes Ga of the second switches $SW_B$ is coupled to the switch terminal $T_B$ via the connection line $L_B$. The connection line $L_B$ is coupled to each of the respective gate electrodes Ga of the second switches $SW_B$. That is to say, one connection line $L_B$ is coupled to each of the second switches $SW_B$.

Thus, each of the drain electrodes Dr of the second switches $SW_B$ is coupled to one of the two signal lines S, each of the source electrodes So thereof is coupled to the other of the two signal lines S, and each of the gate electrodes Ga thereof is coupled to the switch terminal $T_B$ via the connection line $L_B$. Consequently, upon input of a current (the gate signal) to each of the gate electrodes Ga via the switch terminal $T_B$, each of the second switches $SW_B$ electrically couples the two signal lines S to each other. On the other hand, without the current (the gate signal) input to each of the gate electrodes Ga, each of the second switches $SW_B$ electrically interrupts (decouples) the two signal lines S from each other. Thus, each of the second switches $SW_B$ is coupled to the switch terminal $T_B$ and the signal lines S and is configured to be able to switch between connection and interruption between the signal lines S by the gate signal from the switch terminal $T_B$.

Figure 5:
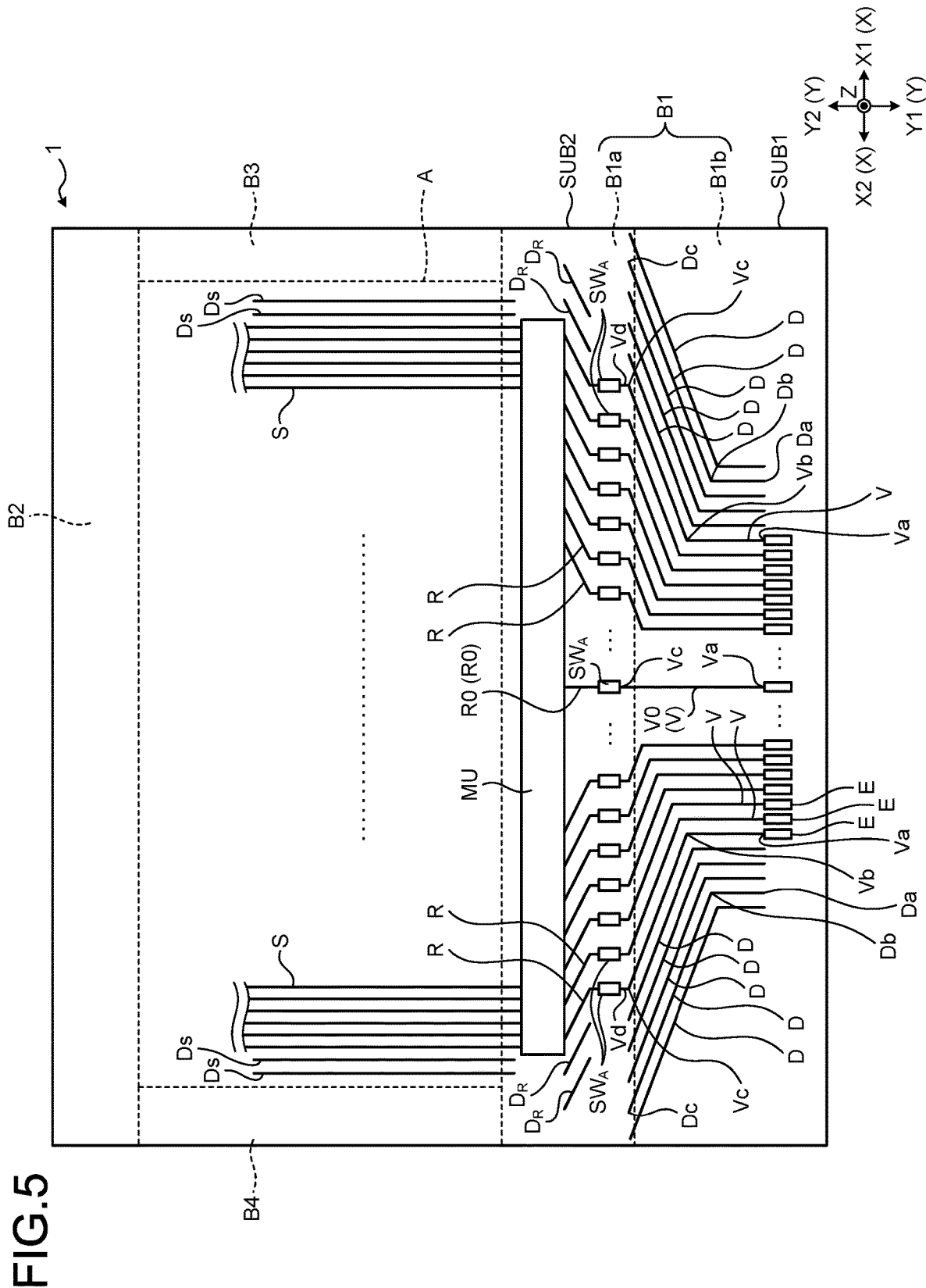
FIG. 5 is a schematic diagram of the configuration of the display device according to the present embodiment.

The following describes a configuration and the like of the wires V in more detail. FIG. 5 is a schematic diagram of the configuration of the display device according to the present embodiment. As illustrated in FIG. 5, the wires V are provided along the first direction X. The wires V extend from portions coupled to the driver terminals E toward the direction Y2, that is, toward the display area A. In more detail, the wires V extend so as to spread toward outsides in the first direction X as they are directed toward the direction Y2. The outsides in the first direction X indicate the direction X1 side or the direction X2 side. That is to say, when the wire V positioned at a center in the first direction X among the wires V is named wire V0, the wires V on the direction X1 side of the wire V0 extend so as to be directed toward the direction X1 (so as to be inclined toward the direction X1) as they are directed toward the direction Y2. The wires V on the direction X2 side of the wire V0 extend so as to be directed toward the direction X2 (so as to be inclined toward the direction X2) as they are directed toward the direction Y2. The direction X1 side can be referred to as one outside in the first direction X, whereas the direction X2 side can be referred to as the other outside in the first direction X. The central wire V0 in the first direction X extends along the direction Y2 and is inclined in neither the direction X1 nor the direction X2. However, the wire V0 may also be inclined in the direction X1 or the direction X2 as it is directed toward the direction Y2.

In more detail, the wires V illustrated in the example in FIG. 5 extend along the direction Y2 (the second direction Y) from a portion Va coupled to the driver terminals E to a portion Vb. The wires V extend so as to spread toward the outsides in the first direction X as they are directed toward the direction Y2 from the portion Vb to a portion Vc. The wires V extend along the direction Y2 (the second direction Y) from the portion Vc to a portion Vd in which each of the wires V is coupled to each of the first switches $SW_A$ and each of the connection lines R. That is to say, the wires V on the direction X1 side of the wire V0 extend along the direction Y2 from the portion Va to the portion Vb, extend so as to be directed toward the direction X1 as they are directed toward the direction Y2 from the portion Vb to the portion Vc, and extend along the direction Y2 from the portion Vc to the portion Vd. Similarly, the wires V on the direction X2 side of the wire V0 extend along the direction Y2 from the portion Va to the portion Vb, extend so as to be directed toward the direction X2 as they are directed toward the direction Y2 from the portion Vb to the portion Vc, and extend along the direction Y2 from the portion Vc to the portion Vd. That is to say, the wires V extend so as to spread toward the outsides in the first direction X as they are directed toward the direction Y2 from the portion Vb to the portion Vc as a partial section. However, the wires V are only required to extend so as to spread toward the outsides in the first direction X as they are directed toward the direction Y2 at least in a partial section. They may extend so as to spread toward the outsides in the first direction X as they are directed toward the direction Y2 in the entire section, for example.

The display device 1 has dummy wires D in the first substrate SUB1. The dummy wires D are wires used for inspecting the wires V by imaging. The dummy wires D are provided on the outsides in the first direction X of the wires V. That is to say, the dummy wires D are provided on the direction X1 side (the one outside in the first direction X) and the direction X2 side (the other outside in the first direction X) of the wires V. In other words, the dummy wires D are provided in an area on the direction X1 side of the wire V furthermost in the direction X1 among the wires V and an area on the direction X2 side of the wire V furthermost in the direction X2 among the wires V. It can be said that the dummy wires D extend from the outer peripheral area B1b to the inner peripheral area B1a and are at least partially provided in the outer peripheral area B1b, in which the first substrate SUB1 and the second substrate SUB2 are not superimposed on each other, like the wires V.

The dummy wires D are provided along the wires V and extend in parallel with the wires V. Consequently, the dummy wires D extend so as to spread toward the outsides in the first direction X as they are directed toward the direction Y2 like the wires V. That is to say, the dummy wires D on the direction X1 side (the direction X1 side of the wire V furthermost in the direction X1) extend so as to be directed toward the direction X1 as they are directed toward the direction Y2. In the example in FIG. 5, the dummy wires D on the direction X1 side extend along the direction Y2 from a portion Da to a portion Db and extend so as to be directed toward the direction X1 as they are directed toward the direction Y2 from the portion Db to a portion Dc. On the other hand, the dummy wires D on the direction X2 side (the direction X2 side of the wire V furthermost in the direction X2) extend so as to be directed toward the direction X2 as they are directed toward the direction Y2. In the example in FIG. 5, the dummy wires D on the direction X2 side extend along the direction Y2 from the portion Da to the portion Db and extend so as to be directed toward the direction X2 as they are directed toward the direction Y2 from the portion Db to the portion Dc.

The dummy wires D are provided along the first direction X. In the example in FIG. 5, the number of the dummy wires D on the direction X1 side is five, whereas the number of the dummy wires D on the direction X2 side is also five. However, five is an example, and the number of the dummy wires D on the direction X1 side and the number of the dummy wires D on the direction X2 side are respectively required to be three or more. The number of the dummy wires D on the direction X1 side and the number of the dummy wires D on the direction X2 side are preferably 30 or less respectively, but they are not limited to be 30 or less. That is to say, the upper limit number of the dummy wires D on the direction X1 side and the dummy wires D on the direction X2 side may be any number so long as a distance to other wires and circuits is appropriately maintained. The number of the dummy wires D on the direction X1 side and the number of the dummy wires D on the direction X2 side may be the same or different from each other.

Figure 6:
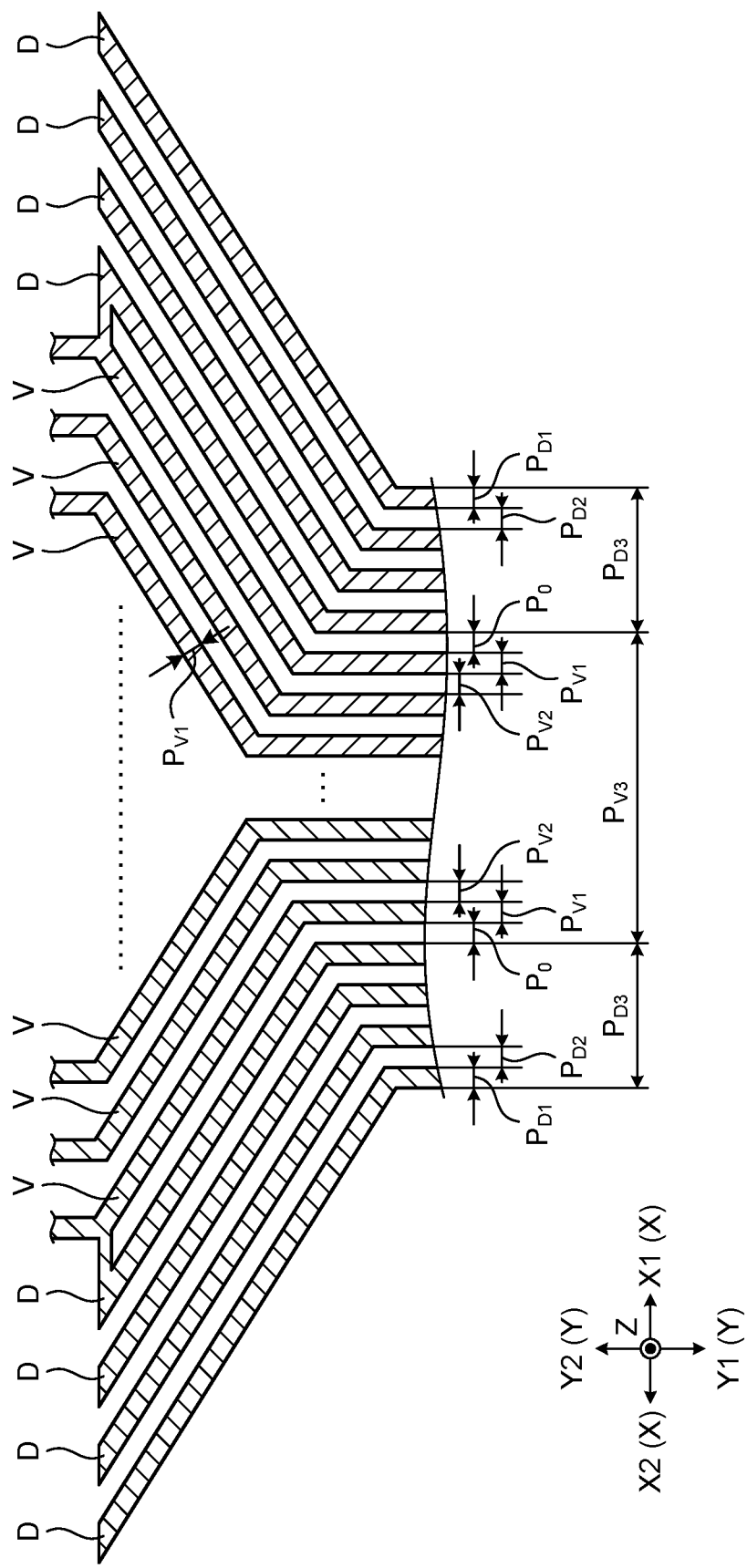
FIG. 6 is a schematic partially enlarged view of wires and dummy wires according to the present embodiment.

FIG. 6 is a schematic partially enlarged view of the wires and the dummy wires according to the present embodiment. As illustrated in FIG. 6, a width $P_{D1}$ of the dummy wires D is equal to a width $P_{V1}$ of the wires V. The width $P_{D1}$ and the width $P_{V1}$ are preferably 3 μm to 10 μm. The width in this example refers to a length of the wires in a direction orthogonal to a long axial direction (an extension direction). A distance (pitch) $P_{D2}$ between the dummy wires D adjacent to each other is equal to a distance (pitch) $P_{V2}$ between the wires V adjacent to each other. The distance $P_{D2}$ and the distance $P_{V2}$ are preferably 6 μm to 10 μm. A distance $P_0$ between a wire V and a dummy wire D adjacent to each other is also equal to the distance $P_{D2}$ and the distance $P_{V2}$.

As illustrated in FIG. 6, the width of an area in which the dummy wires D are provided is defined as a width $P_{D3}$. The width $P_{D3}$ is preferably 150 μm to 300 μm. It can also be said that the width $P_{D3}$ is a length of the area in which the dummy wires D are provided in a direction orthogonal to the extension direction (the long axial direction) of the dummy wires D. That is to say, it can be said that the width $P_{D3}$ is a length of an area in which the dummy wires D are provided on the direction X2 side of the wires V in the direction orthogonal to the extension direction of the dummy wires D and is a length of an area in which the dummy wires D are provided on the direction X1 side of the wires V in the direction orthogonal to the extension direction of the dummy wires D. In other words, it can also be said that the width $P_{D3}$ is a length between an inner side of the dummy wire D innermost in the first direction X and an outer side of the outermost dummy wire D. That is to say, in FIG. 6, it can be said that the distance between a side of the dummy wire D on the direction X1 side which is adjacent to the wire V furthermost in the direction X2 on the direction X2 side and a side of the dummy wire D furthermost in the direction X2 on the direction X2 side is the width $P_{D3}$. It can be said that the distance between a side of the dummy wire D which is adjacent to the wire V furthermost in the direction X1 on the direction X1 side and a side of the dummy wire D furthermost in the direction X1 on the direction X1 side is also the width $P_{D3}$.

The width of an area in which the wires V are provided is defined as a width $P_{V3}$. It can also be said that the width $P_{V3}$ is a length of the area in which the wires V are provided in a direction orthogonal to the extension direction (the long axial direction) of the wires V. That is to say, it can also be said that the width $P_{V3}$ is a length between a side of the wire V furthermost in the direction X1 on the direction X1 side and a side of the wire V furthermost in the direction X2 on the direction X2 side. In this case, the width $P_{D3}$ is preferably 2% to 5% with respect to the width $P_{V3}$.

The dummy wires D placed as described above are not coupled to the driver terminals E and are not coupled to the wires V either. In more detail, the dummy wires D are not coupled to the connection lines R or the signal lines S either. That is to say, the dummy wires D are not coupled to the other conductive members of the display device 1 to float. However, as illustrated in FIG. 6, the dummy wires D closest to the wires V may be coupled to the respective wires V adjacent thereto. In this case as well, the dummy wires D other than the dummy wires D closest to the wires V float.

As illustrated in FIG. 5, the connection lines R are provided in the first substrate SUB1 and are provided along the first direction X. Each of the connection lines R is coupled to each of the wires V and extend in the direction Y2 from the portions coupled to each of the wires V, that is, the portions coupled to each of the first switches $SW_A$ in FIG. 5. In more detail, the connection lines R extend so as to spread toward the outsides in the first direction X as they are directed toward the direction Y2. That is to say, when the connection line R positioned at the center in the first direction X among the connection lines R is named a connection line R0, the connection lines R on the direction X1 side of the connection line R0 extend so as to be directed toward the direction X1 as they are directed toward the direction Y2. The connection lines R on the direction X2 side of the connection line R0 extend so as to be directed toward the direction X2 as they are directed toward the direction Y2. The central connection line R0 in the first direction X extends along the direction Y2 and is inclined in neither the direction X1 nor the direction X2. However, the connection line R0 may also be inclined in the direction X1 or the direction X2 as it is directed toward the direction Y2.

The display device 1 further has dummy connection lines $D_R$ in the first substrate SUB. The dummy connection lines $D_R$ are wires provided in order to inhibit manufacturing defects in the connection lines R. The dummy connection lines $D_R$ are provided on the outsides in the first direction X of the connection lines R. That is to say, the dummy connection lines $D_R$ are provided on the direction X1 side (the one outside in the first direction X) and the direction X2 side (the other outside in the first direction X) of the connection lines R. In other words, the dummy connection lines $D_R$ are provided in an area on the direction X1 side of the connection line R furthermost in the direction X1 among the connection lines R and an area on the direction X2 side of the connection line R furthermost in the direction X2 among the connection lines R. The dummy connection lines $D_R$ are provided in the inner peripheral area B1a, in which the first substrate SUB1 and the second substrate SUB2 are superimposed on each other, across the entire section like the connection lines R.

The dummy connection lines $D_R$ are provided along the connection lines R and extend so as to spread toward the outsides in the first direction X as they are directed toward the direction Y2 like the connection lines R. That is to say, the dummy connection lines $D_R$ on the direction X1 side (the direction X1 side of the connection line R furthermost in the direction X1) extend so as to be directed toward the direction X1 as they are directed toward the direction Y2. The dummy connection lines $D_R$ on the direction X2 side (the direction X2 side of the connection line R furthermost in the direction X2) extend so as to be directed toward the direction X2 as they are directed toward the direction Y2.

The dummy connection lines $D_R$ are provided along the first direction X. In the example in FIG. 5, the number of the dummy connection lines $D_R$ on the direction X1 side is two, whereas the number of the dummy connection lines $D_R$ on the direction X2 side is also two. However, the number of the dummy connection lines $D_R$ is not limited to two for each side as in FIG. 5 and is only required to be smaller than the number of the dummy wires D. That is to say, the number of the dummy connection lines $D_R$ on the direction X1 side and the number of the dummy connection lines $D_R$ on the direction X2 side are smaller than the number of the dummy wires D on the direction X1 side and the number of the dummy wires D on the direction X2 side, respectively.

The dummy connection lines $D_R$ disposed as described above are not coupled to the connection lines R, the signal lines S, the wires V, or the dummy wires D. In more detail, the dummy connection lines $D_R$ are not coupled to the other conductive members of the display device 1 to float. However, the dummy connection line $D_R$ closest to the connection lines R may be coupled to the connection line R adjacent thereto.

Figure 7:
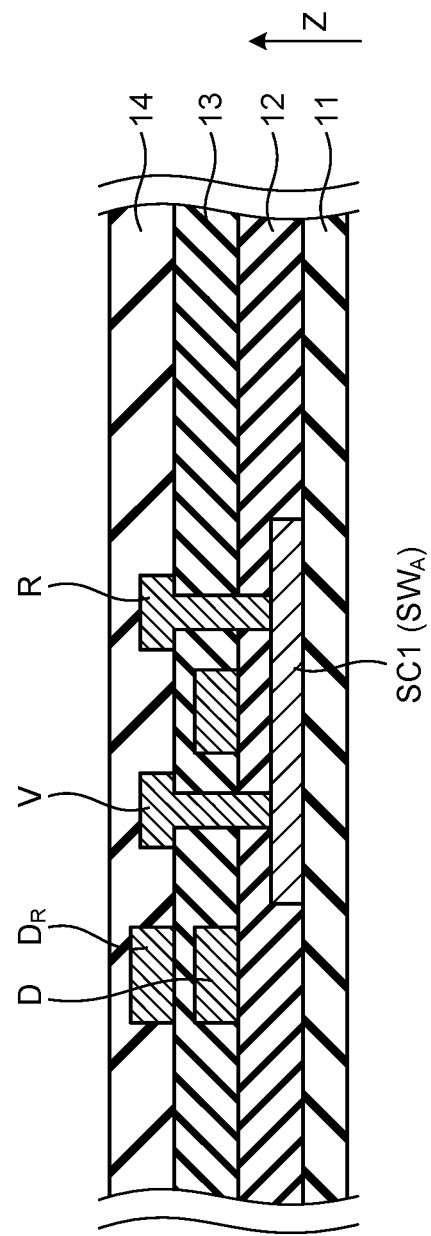
FIG. 7 is a schematic sectional view of a connection line and a dummy connection line and a wire and a dummy wire.

The connection lines R, the dummy connection lines $D_R$, the wires V, and the dummy wires D are provided in different layers in the direction Z. FIG. 7 is a schematic sectional view of the connection line, the dummy connection line, the wire, and the dummy wire. FIG. 7 schematically illustrates a stacking state of a connection line R, a dummy connection line $D_R$, a wire V, a dummy wire D, and a semiconductor layer SC1 of a first switch $SW_A$. As illustrated in FIG. 7, the semiconductor layer SC1 of the first switch $SW_A$ is provided on the insulating layer 11. The wire V is provided on the insulating layer 13 and partially penetrates through the insulating layers 13 and 12 to be in contact with an upper face (a face on the direction Z side) of the semiconductor layer SC1. The dummy wire D is provided on the insulating layer 12. The connection line R is provided on the insulating layer 13 and partially penetrates through the insulating layers 13 and 12 to be in contact with the upper face (the face on the direction Z side) of the semiconductor layer SC1. The dummy connection line $D_R$ is provided on the insulating layer 13. Although omitted in FIG. 7, the signal lines S and dummy signal lines $D_S$ described below are also provided in the same layer as the connection lines R, that is, on the insulating layer 13. Thus, the wires V and the dummy wires D are provided in a lower layer than the connection lines R, the dummy connection lines $D_R$, the signal lines S, and the dummy signal lines $D_S$. The lower layer in this example indicates a layer closer to the illumination device IL in the direction Z and a layer on an opposite side from the liquid crystal layer LC and the color filter layer CF.

As illustrated in FIG. 5, the signal lines S are provided along the first direction X. Each of the signal lines S is coupled to each of the connection lines R via the connection circuit MU and extend within the display area A along the direction Y2. The display device 1 further has dummy signal lines $D_S$ in the first substrate SUB1. The dummy signal lines $D_S$ are wires provided in order to inhibit manufacturing defects in the signal lines S. The dummy signal lines $D_S$ are provided on the outsides in the first direction X of the signal lines S. That is to say, the dummy signal lines $D_S$ are provided on the direction X1 side (the one outside in the first direction X) and the direction X2 side (the other outside in the first direction X) of the signal lines S. In other words, the dummy signal lines $D_S$ are provided in an area on the direction X1 side of the signal line S furthermost in the direction X1 among the signal lines S and an area on the direction X2 side of the signal line S furthermost in the direction X2 among the signal lines S. The dummy signal lines $D_S$ are provided along the signal lines S and extend along the direction Y2 like the signal lines S.

The dummy signal lines $D_S$ are provided along the first direction X. In the example in FIG. 5, the number of the dummy signal lines $D_S$ on the direction X1 side (the direction X1 side of the signal line S furthermost in the direction X1) is two, whereas the number of the dummy signal lines $D_S$ on the direction X2 side (the direction X2 side of the signal line S furthermost in the direction X2) is also two. However, the number of the dummy signal lines $D_S$ is not limited to two for each side as in FIG. 5 and is only required to be smaller than the number of the dummy wires D. That is to say, the number of the dummy signal lines $D_S$ on the direction X1 side and the number of the dummy signal lines $D_S$ on the direction X2 side are smaller than the number of the dummy wires D on the direction X1 side and the number of the dummy wires D on the direction X2 side respectively. Although in FIG. 5 the number of the dummy signal lines $D_S$ is equal to the number of the dummy connection lines $D_R$, they may be different from each other.

The dummy signal lines $D_s$ disposed as described above are not coupled to the signal lines S, the connection lines R, the wires V, the dummy connection lines $D_R$, or the dummy wires D. In more detail, the dummy signal lines $D_s$ are not coupled to the other conductive members of the display device 1 to float. However, the dummy signal line D closest to the signal line S may be coupled to the signal line S adjacent thereto.

(Method of Inspection)

The display device 1 has the configuration described above. The following describes a method for inspecting the wires of the display device 1. The display device 1 includes the signal lines S, the connection lines R, and the wires V as the wires. The method of inspection according to the present embodiment performs an inspection of the signal lines S and the connection lines R by the aging treatment and performs an inspection of the wires V by imaging. The inspection in this example refers to detecting a defective portion in the signal lines S, the connection lines R, and the wires V, for example. The defective portion indicates a semi-broken portion, that is, a portion in which the line width is locally thinned or the like. The aging treatment is treatment performed before shipment of the display device 1 and is treatment passing a current through a wire to break a portion in which the line width is locally thinned in the wire and to detect the defective portion in the wire in advance. The inspection by the imaging refers to an inspection performed before shipment of the display device 1 and is an inspection by imaging the wires V and checking a taken image to detect the defective portion such as the semi-broken portion in the wires V.

Figure 8:
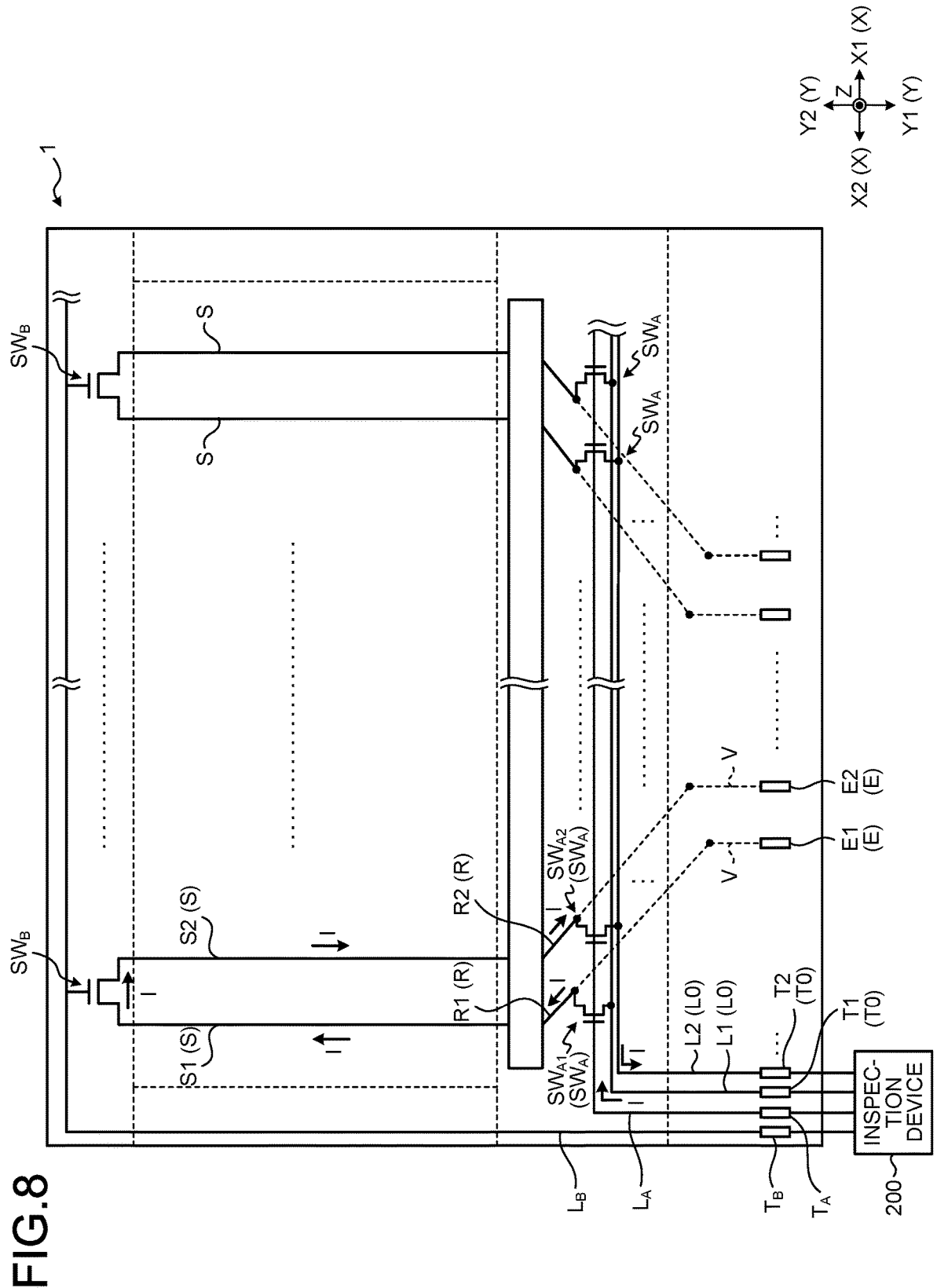
FIG. 8 is a schematic diagram of an example of aging treatment.

The following first describes the aging treatment. FIG. 8 is a schematic diagram of an example of the aging treatment. When the aging treatment is performed, the driver IC 110 is not coupled to the driver terminals E, and the signal from the driver IC 110 is not input to the driver terminals E. However, if the signal from the driver IC 110 is not input to the driver terminals E, the driver IC 110 may be coupled to the driver terminals E.

As illustrated in FIG. 8, when the aging treatment is performed, an inspection device 200 is coupled to the inspection terminals T. The driver IC 110 (refer to FIG. 1) may have a part of the functions of the inspection device 200.

When the aging treatment is performed, the inspection device 200 is coupled to the switch terminal $T_A$, the switch terminal $T_B$, and the output terminals T0. The inspection device 200 outputs a gate signal to the switch terminal $T_A$ and the switch terminal $T_B$. The gate signal is a current having a certain potential and preferably has a constant fixed potential. The inspection device 200 continues to output the gate signal to the switch terminal $T_A$ and the switch terminal $T_B$ for a certain period, that is, for a period during which the aging treatment is performed. The gate signal output to the switch terminal $T_A$ is input to each of the gate electrodes Ga of the first switches $SW_A$ via the connection line $L_A$. Upon input of the gate signal to each of the gate electrodes Ga, the first switches $SW_A$ couple the connection line L0 and each of the connection lines R, that is, the output terminal T0 and each of the signal lines S, to each other. In the example in FIG. 8, the first switch $SW_{A1}$ couples the connection line L1 and the connection line R1 to each other, whereas the first switch $SW_{A2}$ couples the connection line L2 and the connection line R2 to each other. On the other hand, the gate signal output to the switch terminal $T_B$ is input to each of the gate electrodes Ga of the second switches $SW_B$ via the connection line $L_B$. Upon input of the gate signal to each of the gate electrodes Ga, the second switches $SW_B$ couple the signal lines S, or the signal line S1 and the signal line S2 in the example in FIG. 8, to each other. Thus, a closed circuit is formed by the inspection device 200, the output terminal T1, the connection line L1, the first switch $SW_{A1}$, the connection line R1, the signal line S1, the second switch $SW_B$, the signal line S2, the connection line R2, the first switch $SW_{A2}$, the connection line L2, and the output terminal T2.

Further, the inspection device 200 outputs an inspection signal to the output terminal T0. The inspection signal is a current with a certain potential. The inspection device 200 outputs inspection signals with different potentials to output terminals T0 paired up with each other. The inspection device 200 preferably outputs inspection signals opposite in polarity to each other to the output terminals T0 paired up with each other. The output terminals T0 paired up with each other indicate two output terminals T0 coupled to two signal lines S to which the same second switch $SW_R$ is coupled and are the output terminal T1 and the output terminal T2 in the example in FIG. 8. In the example in FIG. 8, the inspection device 200 outputs an inspection signal with a positive-polarity potential to the output terminal T1 and outputs an inspection signal with a negative-polarity potential to the output terminal T2. The first switches $SW_A$ and the second switch $SW_B$ form the closed circuit as described above, and thus owing to the potential difference between the inspection signal at the output terminal T1 and the inspection signal at the output terminal T2, a current I passes from the output terminal T1 through the connection line L1, the first switch $SW_{A1}$, the connection line R1, the signal line S1, the second switch $SW_B$, the signal line S2, the connection line R2, the first switch $SW_{A2}$, the connection line L2, and the output terminal T2. The inspection device 200 sets the potential difference between the output terminal T1 and the output terminal T2 high as a few tens of volts, for example, to pass the current I with a high voltage. The voltage value of the current I is set to be at least higher than the voltage of the image signal from the driver IC 110. The inspection device 200 may exchange polarity of the inspection signals to be output to the output terminal T1 and the output terminal T2 for each lapse of a certain time. Thus, the direction of the current I passed for each certain time can be reversed.

In the aging treatment illustrated in FIG. 8, the current I is thus passed through the signal lines S and the connection lines R, whereby when there is a semi-broken portion in the signal lines S or the connection lines R, the portion can be broken. By breaking the portion and detecting the broken portion before shipment, whereby breakage after shipment can be inhibited, and reliability can be improved. When the signal lines S or the connection lines R are broken in the aging treatment, the current becomes not to pass, and thus the inspection device 200 detects that no current and voltage is passed, and thus it can be detected whether the signal lines S or the connection lines R have been broken. When an image signal is output to the signal lines S in a lighting inspection or the like after the aging treatment, for example, the broken portion is not displayed in color, and thus by detecting it, it can also be detected whether the signal lines S or the connection lines R have been broken.

Upon end of the aging treatment, the inspection terminals T are preferably blocked before shipment of the display device 1. Upon end of the aging treatment, before shipment of the display device 1, it is preferable to perform treatment not to pass a current through the gate electrodes Ga so that the first switches $SW_A$ and the second switches $SW_B$ are not driven.

Thus, the aging treatment is performed, whereby the current I can be passed through the signal lines S and the connection lines R present between the first switches $SW_A$ and the second switch $SW_B$, and an inspection can be performed therefor. However, the wires V are not present between the first switches $SW_A$ and the second switch $SW_B$, thus the current I does not pass therethrough, and thus an inspection cannot be performed by the aging treatment. Given this, the method of inspection according to the present embodiment images the wires V to perform the inspection of the wires V.

Figure 9:
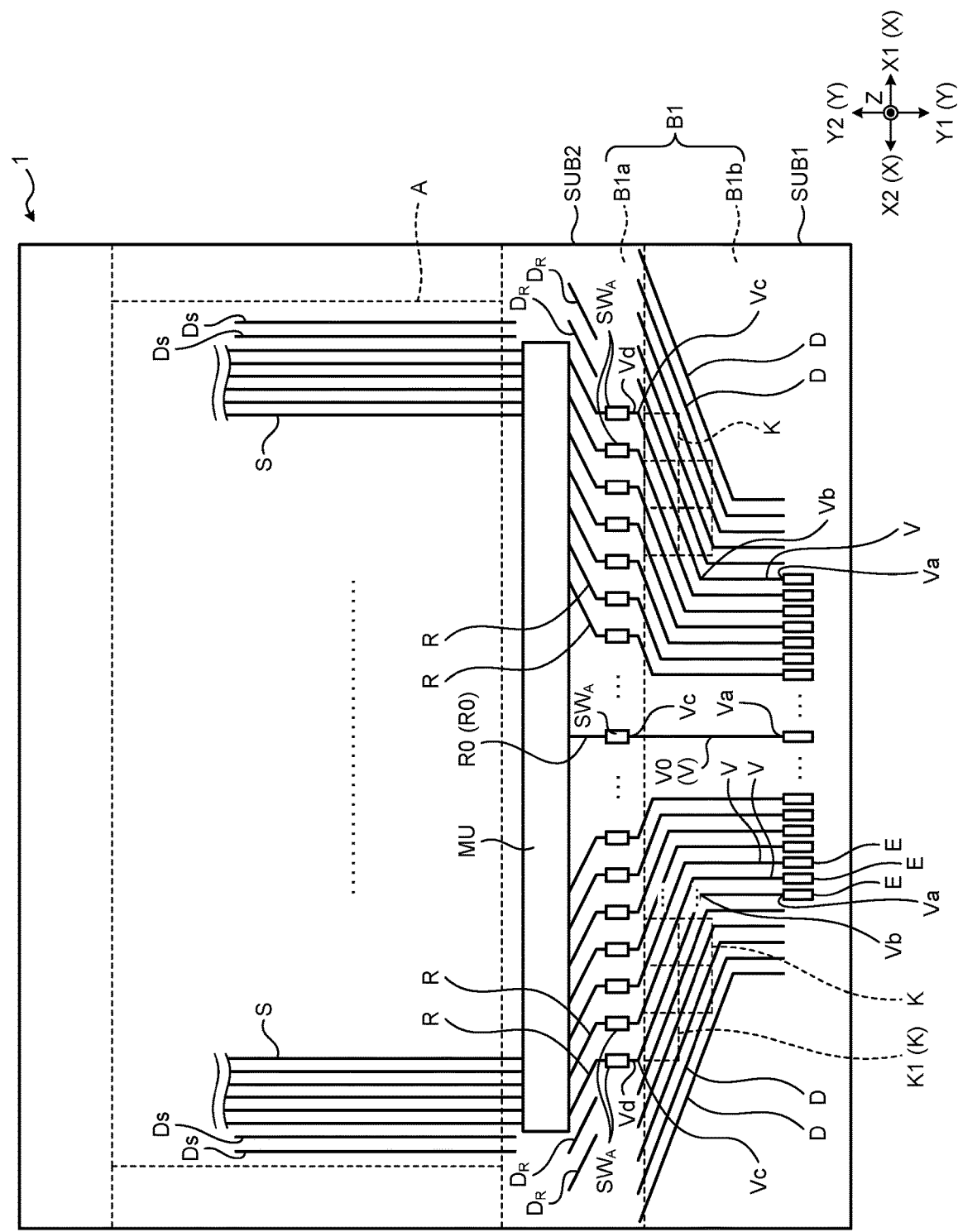
FIG. 9 is a schematic diagram of an example of an inspection of the wires.
Figure 10:
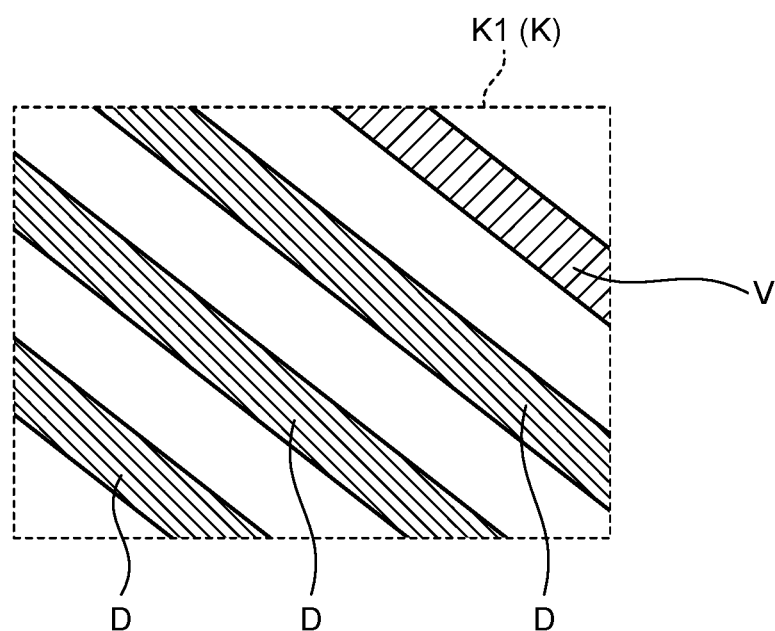
FIG. 10 is an enlarged view of an imaging area.

FIG. 9 is a schematic diagram of an example of an inspection of the wires. FIG. 10 is an enlarged view of an imaging area. As illustrated in FIG. 9, when the inspection of the wires V is performed, an area in which the wires V are provided of the first substrate SUB1 is imaged in the direction Z with an imaging device not illustrated. That is to say, the imaging device images the area in which the wires V are provided while moving its position in the first direction X and the second direction Y. As illustrated in FIG. 9, an imaging area K as a range imaged by the imaging device includes the multiple wires V.

In the inspection of the wires V, the wires V within a taken image, that is, the wires V within the imaging area K are compared with each other. A wire V having a pattern abnormality with respect to another wire V such as an adjacent wire V is detected as a defective wire V, or as a semi-broken wire V, for example. The inspection is performed by a comparison with the other wire V within one imaging area K, and thus the one imaging area K preferably includes the multiple, such as four or more, wires V so that detection accuracy improves. However, the wires V extend so as to spread toward the outsides in the first direction X as they are directed toward the direction Y2, that is, in an oblique direction. Consequently, when the wires V on the outsides are imaged, only one wire V may be included in the imaging area K1 illustrated in FIG. 9, for example. In this case, a comparison between the wires V cannot be performed, and the inspection of the wires V cannot appropriately be performed. Given this, the display device 1 according to the present embodiment is provided with the dummy wires D outside the wires V. Consequently, even when the wires V on the outsides are imaged, the dummy wires D are imaged together with the wire V as illustrated in the imaging area K1 in FIG. 10, for example. Thus, even when only one wire V is imaged within one imaging area K, for example, the dummy wires D and the wire V are compared with each other, whereby the inspection of the wire V can suitably be performed. In the present embodiment, three or more dummy wires D are provided, and thus even when only one wire V is imaged within one imaging area K, the three wires D can be imaged within the imaging area K, thus a total of four or more wires can be compared with each other, and thus an inspection can suitably be performed.

The imaging device takes an image such that the imaging area K includes the section from the portion Vb to the portion Vc of the wires V. That is to say, the imaging area K includes a portion of the wires V from which they extend so as to spread toward the outsides in the first direction X as they are directed toward the direction Y2. The wires V positioned further outside in the first direction X have higher possibility of being semi-broken. The wires V positioned further outside in the first direction X have a longer length from the portion Vb to the portion Vc. Consequently, the imaging area K includes the section from the portion Vb to the portion Vc, whereby an inspection over the long section from the portion Vb to the portion Vc can be performed for the wires V on the outsides, which are likely to be semi-broken.

As described above, the display device 1 according to the present embodiment includes the wires V and the dummy wires D. The wires V are coupled to the driver terminals E that can be coupled to the driver IC 110, the wires V being provided along the first direction X. The wires V extend so as to spread toward the outsides in the first direction X as they are directed toward the second direction Y (the direction Y2) orthogonal to the first direction X. The dummy wires D are provided along the wires V on the one outside and the other outside in the first direction X of the wires V. The dummy wires D are not coupled to the driver terminals E or the wires V. The number of the dummy wires D on the one outside, that is, the direction X1 side, and the number of the dummy wires D on the other outside, that is, the direction X2 side, are each three or more.

The display device 1 according to the present embodiment includes the wires V made oblique so as to spread toward the outsides in the first direction X as they are directed toward the second direction Y. The three or more dummy wires D on one side are provided outside the wires V. Consequently, when the wires V are imaged to be inspected, enough dummy wires D can be included in the imaging area K, and thus the wires V can suitably be inspected. This display device 1 have a configuration in which the wires V can be suitably inspected and can thus inhibit a deterioration of reliability.

The dummy wires D extend in parallel with the wires V, and the width $P_{D1}$ of the dummy wires D is equal to the width $P_{V1}$ of the wires V. These dummy wires D are parallel to the wires V and have the width equal thereto, and thus the inspection comparing the wires V and the dummy wires D with each other can be performed with high precision. Consequently, this display device 1 can inhibit a deterioration of reliability.

The length (the width $P_{D3}$) of the area in which the dummy wires D are provided on the one outside, that is, the direction X1 side, and the area in which the dummy wires D are provided on the other outside, that is, the direction X2 side, in the direction orthogonal to the extension direction of the dummy wires D is 150 μm to 300 μm. The dummy wires D are disposed in this range, whereby the inspection comparing the wires V and the dummy wires D with each other can be performed with high precision. The dummy wires D are placed in this range, whereby positional variations when the imaging device moves can be absorbed. Consequently, this display device 1 can inhibit a deterioration of reliability.

The display device 1 further has the first switches $SW_A$ as the switches coupled to the wires V and the signal lines S coupled to the first switches $SW_A$ and the wires V to supply signals to the pixels PX. This display device 1 has the first switches $SW_A$ and can thereby suitably perform the inspection of the signal lines S and can thus inhibit a deterioration of reliability.

The display device 1 includes the first substrate SUB1 provided with the wires V, the dummy wires D, the first switches $SW_A$, and the signal lines S, and the second substrate SUB 2. The wires V and the dummy wires D are at least partially provided in the projecting area AR2, in which the first substrate SUB1 and the second substrate SUB2 are not superimposed on each other. The first switches $SW_A$ and the signal lines S are provided in the superimposed area AR1, in which the first substrate SUB1 and the second substrate SUB2 are superimposed on each other. This display device 1 has the dummy wires D and the first switches $SW_A$ present at this position, and can thus suitably perform the inspection of the wires V and the signal lines S, and can thus inhibit a deterioration of reliability.

The wires V and the dummy wires D are provided in a lower layer than the signal lines S. This display device 1 has the dummy wires D and the first switches $SW_A$ present at this position, and can suitably perform the inspection of the wires V and the signal lines S, and can inhibit a deterioration of reliability.

This display device 1 further has the dummy signal lines $D_s$. The dummy signal lines $D_s$ are provided along the signal lines S on the one outside and the other outside in the first direction X of the signal lines S and are not coupled to the signal lines S. The number of the dummy wires D is larger than the number of the dummy signal lines $D_s$. The dummy signal lines $D_s$ and the dummy connection lines $D_R$ are provided in order to inhibit manufacturing defects in the signal lines S and the connection lines R. That is to say, the wires on the outsides are likely to cause defects at the time of patterning. Given this, the dummy signal lines $D_s$ and the dummy connection lines $D_R$, which are dummy wires, are provided further outside, whereby defects in the wires are inhibited. Meanwhile, the dummy wires D are used for the imaging inspection of the wires V, and the number of them is preferably larger. In the present embodiment, the number of the dummy wires D is made larger, whereas the numbers of the dummy signal lines $D_s$ and the dummy connection lines $D_R$ are made smaller, whereby defects in the wires on the outsides can be inhibited while increasing the inspection accuracy of the wires V.

The method for inspecting the display device 1 according to the present embodiment images the imaging area K including the wires V and the dummy wires D to inspect the wires V. This method of inspection can suitably inspect the wires V and can thus inhibit a deterioration of reliability.

(Modification)

The following describes a modification. A display device 1a according to the modification is different from the display device 1 of the present invention in that it has multiple wire groups including multiple wires V. In the display device 1a according to the modification, a description is omitted for portions common to those of the display device 1 of the present embodiment in configuration.

Figure 11:
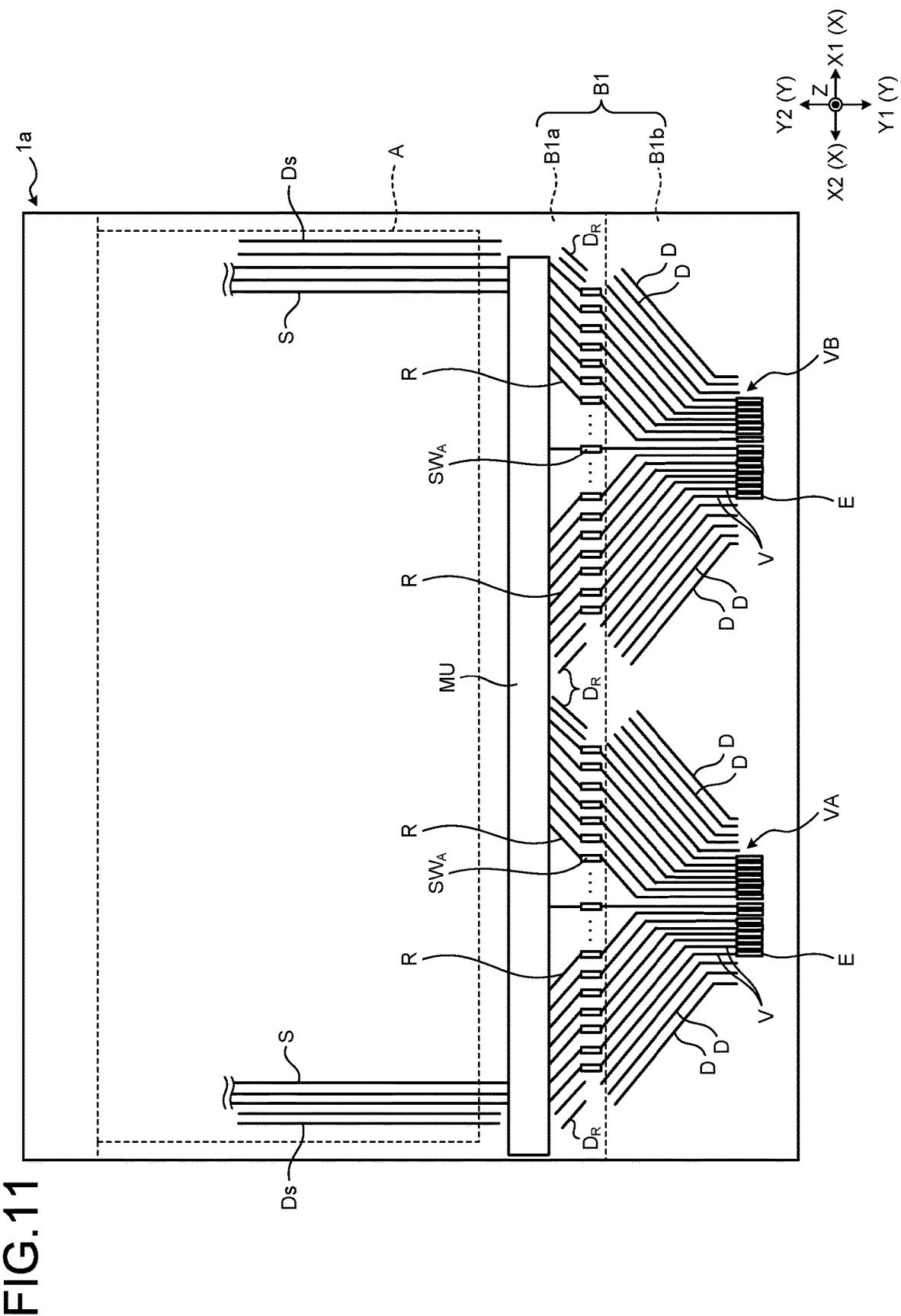
FIG. 11 is a schematic diagram of a configuration of a display device according to a modification.

FIG. 11 is a schematic diagram of a configuration of the display device according to the modification. As illustrated in FIG. 11, the display device 1a according to the modification has a first wire group VA and a second wire group VB including the wires V. The first wire group VA includes the wires V extending so as to spread towards the outsides in the first direction as they are directed toward the direction Y2. Similarly, the second wire group VB includes the wires V extending so as to spread towards the outsides in the first direction as they are directed toward the direction Y2. That is to say, it can be said that each of the first wire group VA and the second wire group VB is the wires V of the display device 1 illustrated in FIG. 5. The first wire group VA and the second wire group VB are adjacent to each other in the first direction X. In the example in FIG. 11, the first wire group VA is positioned on the direction X2 side, whereas the second wire group VB is positioned on the direction X1 side.

Multiple dummy wires D are provided on one outside and the other outside in the first direction X of the first wire group VA. In the modification, the number of the dummy wires D on the direction X1 side of the first wire group VA is larger than the number of the dummy wires D on the direction X2 side of the first wire group VA. That is to say, the number of the dummy wires D provided on a side of the first wire group VA closer to the second wire group VB is larger than the number of the dummy wires D provided on an opposite side of the first wire group VA from the second wire group VB.

Multiple dummy wires D are provided on one outside and the other outside in the first direction X of the second wire group VB. In the modification, the number of the dummy wires D on the direction X2 side of the second wire group VB is larger than the number of the dummy wires D on the direction X1 side of the second wire group VB. That is to say, the number of the dummy wires D provided on a side of the second wire group VB closer to the first wire group VA is larger than the number of the dummy wires D provided on an opposite side of the second wire group VB from the first wire group VA.

Thus, the display device 1a according to the modification has the first wire group VA and the second wire group VB including the wires V extending so as to spread toward the outsides in the first direction X as they are directed toward the second direction Y (the direction Y2), in which the first wire group VA and the second wire group VB are adjacent to each other in the first direction X. The number of the dummy wires D provided on the side of the first wire group VA closer to the second wire group VB is larger than the number of the dummy wires D provided on the opposite side of the first wire group VA from the second wire group VB. The number of the dummy wires D provided on the side of the second wire group VB closer to the first wire group VA is larger than the number of the dummy wires D provided on the opposite side of the second wire group VB from the first wire group VA. Thus, in the display device 1a according to the modification, the number of the dummy wires D between the first wire group VA and the second wire group VB is larger than the number of the dummy wires D outside the first wire group VA and the second wire group VB. That is to say, the modification places more dummy wires D in an area with few circuits to have enough space, which is between the first wire group VA and the second wire group VB, and can thus increase detection accuracy.

Although FIG. 11 illustrates an example having two wire groups, when there are three or more wire groups as well, the number of the dummy wires D between two wire groups can be made larger similarly.

It is understood that other effects brought about by the aspects described in the present embodiment that are obvious from the description of the present specification or can be thought of as appropriate by those skilled in the art are naturally brought about by this invention.

Reference Signs List

1 DISPLAY DEVICE
110 DRIVER IC
A DISPLAY AREA
B PERIPHERAL AREA
D DUMMY WIRE
$D_R$ DUMMY CONNECTION LINE
$D_S$ DUMMY SIGNAL LINE
E DRIVER TERMINAL
PX PIXEL
R CONNECTION LINE
S SIGNAL LINE
$SW_A$ FIRST SWITCH (SWITCH)
V WIRE
X FIRST DIRECTION
Y SECOND DIRECTION

What is claimed is:

1. A display device comprising:
   wires that are coupled to driver terminals that are able to be coupled to a driver integrated circuit (IC) and that are provided along a first direction and extending so as to spread toward outsides in the first direction as the wires are directed toward a second direction orthogonal to the first direction;
   dummy wires that are provided along the wires on one outside and another outside in the first direction of the wires and that are not coupled to the driver terminals and the wires,
   signal lines each coupled to a corresponding one of the wires through a switch, the signal lines supplying signals to multiple pixels, and
   dummy signal lines that are provided along the signal lines on the one outside and the another outside in the first direction of the signal lines and that are not coupled to the signal lines,
   wherein
   a number of the dummy wires on the one outside and a number of the dummy wires on the other outside are respectively three or more,
   the dummy wires extend in parallel with the wires,
   a width of the dummy wire is equal to a width of the wire, and
   a number of the dummy wires is larger than a number of the dummy signal lines that extended in parallel with the signal lines.

2. The display device according to claim 1, further comprising: a first substrate provided with the wires, the dummy wires, a plurality of the switches, and the signal lines; and a second substrate, wherein
   the wires and the dummy wires are at least partially provided in an area in which the first substrate and the second substrate are not superimposed on each other, whereas the switches and the signal lines are provided in another area in which the first substrate and the second substrate are superimposed on each other.

3. The display device according to claim 1, wherein the wires and the dummy wires are provided in a lower layer than the signal lines.

4. The display device according to claim 1, further comprising a first wire group and a second wire group each of which includes the wires extending so as to spread toward the outsides in the first direction as the wires are directed toward the second direction, the first wire group and the second wire group being adjacent to each other in the first direction, wherein
- a number of the dummy wires provided on a side of the first wire group closer to the second wire group is larger than a number of the dummy wires provided on an opposite side of the first wire group from the second wire group, and
- a number of the dummy wires provided on a side of the second wire group closer to the first wire group is larger than a number of the dummy wires provided on an opposite side of the second wire group from the first wire group.

5. A method for inspecting the display device according to claim 1, the method comprising imaging an area including the wires and the dummy wires to inspect the wires.

* * * * *